Feb. 9, 1932.                C. L. JORDAN                1,844,124
ROAD MACHINERY
Filed Oct. 29, 1929
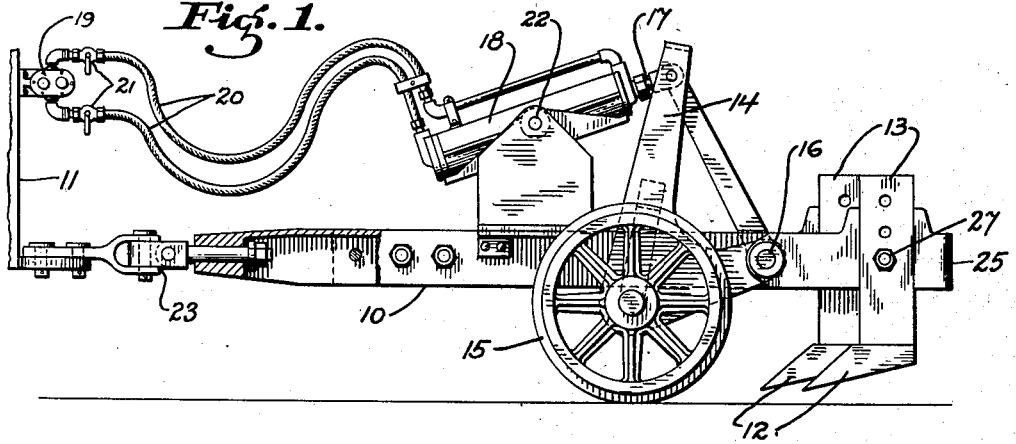
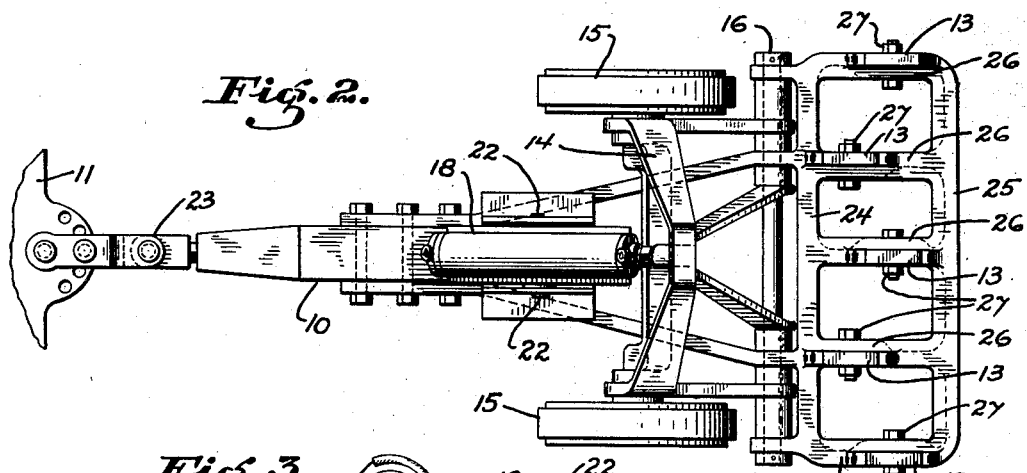
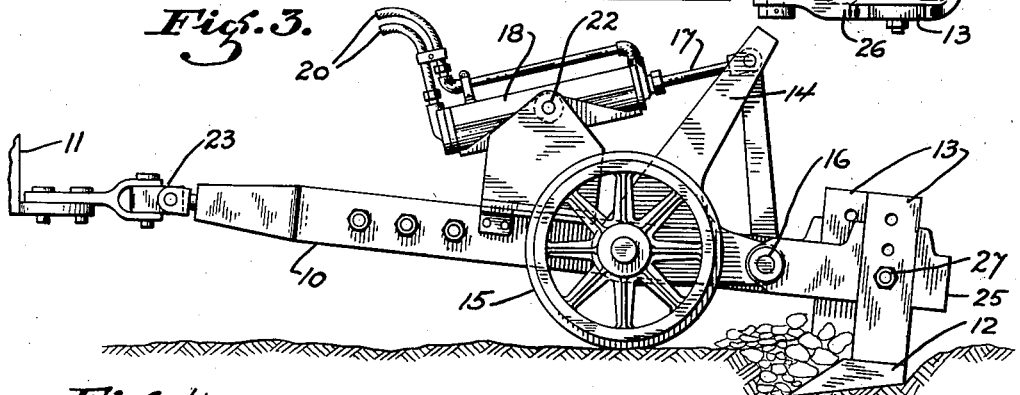
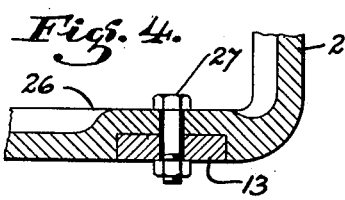
INVENTOR.
Christopher L. Jordan.
BY
Townsend, Loftin & Abbott
ATTORNEYS.

Patented Feb. 9, 1932

1,844,124

UNITED STATES PATENT OFFICE

CHRISTOPHER L. JORDAN, OF BELMONT, CALIFORNIA

ROAD MACHINERY

Application filed October 29, 1929. Serial No. 403,220.

My present invention relates to earth working and digging apparatus, and more particularly to a drag or scarifier for loosening the surface earth, pavements, etc.

An object of my invention is to provide a new and improved type of drag or scarifier which may be readily attached to a traction engine of the present prevailing type and which will operate in an efficient manner as a part thereof.

A further object of my invention is to provide a new and improved scarifier which may be supported at one end by a tractor or the like and raised or lowered at its trailing end so as to bring the scarifier teeth into and out of engagement with the ground.

Another object of my invention is to provide a new and novel type of rolling support for a scarifier of the character contemplated by my invention, whereby the working teeth thereof may be readily raised and lowered with respect to the ground in an efficient, practical and convenient manner.

A further object of my invention is to provide a new and novel arrangement of mounting for scarifier teeth, wherein the teeth, when subjected to excessive or breaking strains, will be released to thereby forestall the possibility of more serious damage being occasioned to the scarifier proper.

In carrying out my invention, I propose to provide a frame which will extend horizontally and in trailing relation with a suitable traction engine, and which will be supported at one end thereby. At the trailing end of this frame, I provide a wheel supporting frame in hinged engagement with said first frame. This wheel supporting frame is so hinged upon the first frame that when it is rocked, as will hereinafter appear, about its pivotal connection, the scarifier teeth will be raised and lowered with respect to the ground.

For a better understanding of my invention, reference should be had to the accompanying drawings, wherein I have shown by way of illustration and not of limitation a preferred embodiment of my invention.

In the drawings—

Fig. 1 is a view in elevation showing my improved scarifier in its raised condition, Fig. 2 is a plan view of the scarifier shown in Fig. 1, Fig. 3 is a view similar to Fig. 1 showing the scarifier lowered into working engagement with the ground, and Fig. 4 is a fragmentary, sectional view showing a detail of construction.

In the drawings, 10 designates a horizontally extending framework which is adapted to be attached and supported at one end upon any suitable type of traction means 11. At the trailing end of the frame 10 I provide a plurality of ground engaging teeth 12 which have vertically extending shanks 13. A second frame 14, upon which there is mounted a pair of wheels 15, is pivoted at a point 16 in advance of the scarifier teeth 12 and attached to an upwardly projecting portion of the frame 14, I provide a piston rod 17 which is adapted to be actuated by a fluid pressure cylinder 18. It is contemplated that a suitable fluid pressure producing apparatus 19 will be provided upon and driven by the traction means. Interposed between the fluid pressure producing means 19 and the cylinder 18, there is shown a pair of fluid carrying conduits 20, in which there are interposed suitable controlling valves 21.

By referring to Fig. 2, it will be seen that the frame 14 is constructed in the form of a yoke so that it will straddle the main horizontal frame 10. With this arrangement, it will be readily appreciated that, when fluid under pressure is admitted to the forward end of the cylinder 18, the piston rod 17 will be extended and thus rock the frame 14 about its pivotal connection 16 and cause the frame 10 with its teeth 12 to be lowered into contact with the ground; and that when fluid is admitted to the rear end of the cylinder 18, a reverse action will take place and the scarifier teeth 12 will be raised out of contact with the ground.

In connection with the operation of the cylinder, it should be noted that it is mounted so that it can oscillate about a pivotal support 22 and thus prevent a binding of the piston rod 17 as its end travels through an arcuate path.

In Fig. 1 of the drawings, I have shown the fluid pressure producing means 19 as a pump and in this instance it will be understood that when the pump is employed, it will only be necessary to reverse the direction of operation and in this manner effect a movement of the piston rod 17 by pumping the fluid from one end of the cylinder into the other.

The mode of attaching my improved device to a traction means is of some importance as this attachment should be somewhat in the nature of that illustrated wherein the main frame is shown as connected by means of a swivel and universal joint connection 23. This will permit a free movement of the scarifier and increase its effectiveness, especially where working over rough ground.

By referring now to Fig. 2, it will be seen that the rear end of the frame 10 is formed of rectangular configuration, the rectangle consisting of two transversely extending webs 24 and 25 and a plurality of longitudinally extending webs 26. Arranged in staggered relation and projecting vertically along one side of the webs 26, I show suitable recesses in which the shanks 13 of the scarifier teeth may lie. Extending through the shanks 13 and the webs 26, I show a single bolt or other securing means 27, which serves to hold the teeth in their proper position upon the frame. This bolt or securing means 27 is purposely made, as illustrated in Fig. 4, of relatively light construction as it is intended that this securing means 27 shall normally serve only as a retaining means for the shanks 13 upon the webs. In other words, the securing means 27, because of the disposition of the shanks 13 within the grooves in the webs 26, as illustrated, are not intended to be subjected to any shearing strains or stresses, as these strains will be imparted directly to the webs 26 because of their engagement with the forward and rear edge of the shanks 13. With this construction, it will be seen that I have produced a means of connecting the teeth 12 in a rigid manner upon the frame 10 without at the same time complicating the construction so as to make it difficult to remove them, should this be desired. It will also be seen that if at any time the teeth are subjected to transverse or twisting strains, the securing means 27 will be ruptured and thus avoid a breaking of the main frame portion 10.

While I have, for the sake of clearness and in order to disclose my invention so that the same can be readily understood, described and illustrated specific devices and arrangements, I desire to have it understood that this invention is not limited to the specific means disclosed but may be embodied in other ways that will suggest themselves, in view of this broad disclosure, to persons skilled in the art. It is believed that this invention is broadly new and it is desired to claim it as such so that all such changes as come within the scope of the appended claims are to be considered as part of this invention.

Having thus described my invention, what I claim and desire to secure by Letters Patent is—

1. A scarifier of the character described comprising, a frame, means at one end of the frame for connecting it to a traction device, wheels intermediate the ends of the frame, means for raising and lowering said wheels with respect to the frame, a pair of spaced bars arranged transversely of the frame at the other end thereof, a plurality of webs connecting said bars at spaced intervals and arranged edgewise with respect to the ground, said webs having vertically extending recesses in their sides and scarifier teeth carried by said recesses.

2. A scarifier of the character described, comprising, a frame, means at one end of the frame for connecting it to a traction device, wheels intermediate the ends of the frame, means for raising and lowering said wheels with respect to the frame, a pair of spaced bars arranged transversely of the frame at the other end thereof, a plurality of webs connecting said bars at spaced intervals and arranged edgewise with respect to the ground, the end of said frame, said bars and said webs being integrally cast, each of said webs having a vertical recess formed therein for the reception of sacrifier teeth in staggered order, and means for securing said teeth in said recesses, said means being breakable under conditions of abnormal transverse stress.

CHRISTOPHER L. JORDAN.